Sept. 5, 1944.     G. C. PEARCE     2,357,353
METHOD AND APPARATUS FOR TESTING THERMOSTATIC CONTROL DEVICES
Filed Jan. 28, 1941
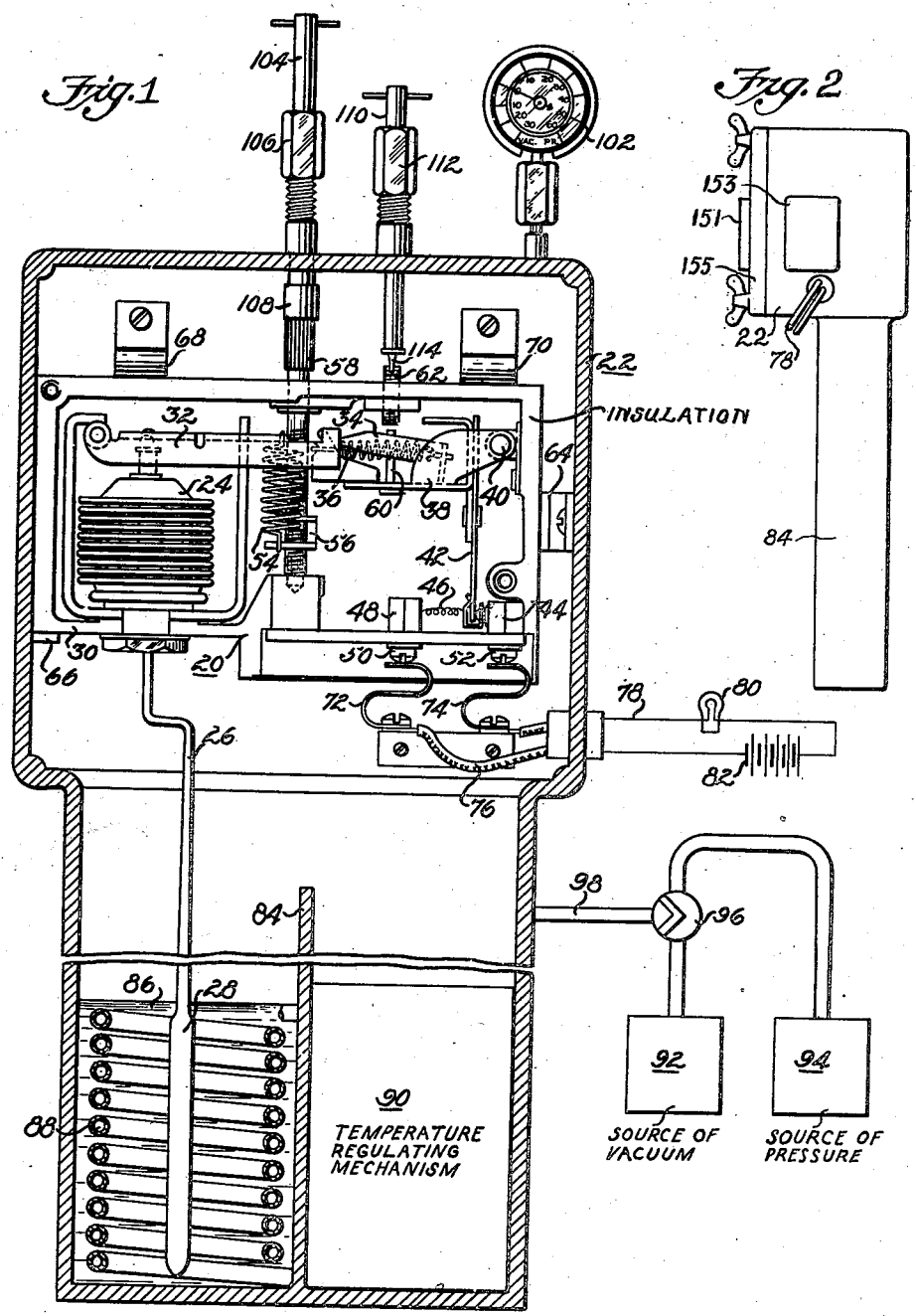
INVENTOR.
George C Pearce
BY Spencer Hardman and Fehr
attorneys Patented Sept. 5, 1944

2,357,353

UNITED STATES PATENT OFFICE 2,357,353

METHOD AND APPARATUS FOR TESTING THERMOSTATIC CONTROL DEVICES

George C. Pearce, Dayton, Ohio, assignor to General Motors Corporation, Dayton, Ohio, a corporation of Delaware Application January 28, 1941, Serial No. 376,363

13 Claims. (Cl. 73—51)

This invention relates to a method of and apparatus for setting, checking, calibrating, testing and adjusting thermostatic devices having pressure and thermo-sensitive elements for refrigerating systems and other applications.

The usual method of setting and testing thermostatic type controls having pressure and thermo-sensitive elements is to vary the temperature of the bulb while the mechanism is in the air at prevailing barometric pressures. This is done by placing the bulb in various baths of different temperatures. To secure the best results, it is desirable to use for each setting, two wells or baths having temperatures just above and below the desired setting. For ordinary refrigerator switches it has been necessary to use from four to six wells or baths. Two of these wells are for testing the cut-out point of the switch, while two are used for testing the cut-in point, while two more are required for testing the defrosting point on the switch, if a separate defrosting mechanism is provided. The use of the wells in this way is a somewhat slow procedure since adequate time must be allowed for the bulb to assume the temperature of the well. Since refrigeration settings are normally below freezing temperatures, it is necessary to use some sort of a brine in the well or bath. Also, by this method, variations in the barometric pressure affect the accuracy of the switch setting.

It is an object of my invention to provide a method of and apparatus for setting and testing thermostatic type devices having pressure and thermo-sensitive elements which is more rapid and more accurate than prior methods and apparatus.

It is another object of my invention to provide an improved method of and apparatus for setting and testing thermostatic type controls having pressure and thermo-sensitive elements wherein only a single well at a single temperature is required for a number of different settings over a comparatively wide range of temperatures.

It is another object of my invention to provide an improved method of and apparatus for setting and testing thermostatic type controls having pressure and thermo-sensitive elements which can be performed at temperatures above freezing regardless of the range of settings required.

It is still another object of my invention to provide an improved method of and apparatus for setting and testing thermostatic type controls having pressure and thermo-sensitive elements wherein errors due to changes in barometric pressures are eliminated.

One specific example of my invention resides in a method of testing adjustable thermostatic control devices having thermo-sensitive and pressure elements with the movements of the pressure elements utilized to actuate circuit makers and breakers to determine whether the circuit makers and breakers close and open at certain temperatures to which the thermo-sensitive elements are responsive and in adjusting the setting of the control device to obtain such a result and in apparatus to carry out the method. The prominent features of such method reside in maintaining the thermo-sensitive element at a substantial constant temperature, applying to the pressure element an external pressure corresponding to the difference between the pressure generated by the thermo-sensitive element at the temperature at which it is held at substantially constant temperature and the pressure generated by the thermo-sensitive element at the temperature at which the circuit maker or breaker is desired to be closed or opened and in adjusting the control device so that the circuit maker or breaker will close or open at such temperature. The prominent features of applicant's apparatus reside in a sealed casing having an access opening and sealed cover for the opening containing a support for the control devices and a constant temperature means for the thermo-sensitive elements. In communication with the interior of the casing is a pressure source for applying a variable external pressure to the pressure element and a pressure gauge for indicating the pressure. The casing carries means which extend from the interior to the exterior of the casing in a fluid sealed manner for setting the adjustable feature of the control device. Also the casing has either or both a window through which may be observed when the circuit maker or breaker opens or closes contact and a signal device exterior of the casing in circuit with the circuit maker or breaker.

Further objects and advantages of the present invention will be apparent from the following description, reference being had to the accompanying drawing, wherein a preferred form of the present invention is clearly shown.

In the drawing:

Fig. 1 is a view, partly diagrammatic, showing a refrigerator switch being tested in an apparatus embodying one form of my invention.

Fig. 2 is a side view of the apparatus shown in Fig. 1, with the pressure connection 88.

Briefly, in my improved method I maintain the temperature of the bulb of the control substantially constant with comparatively great accuracy. In order to secure the same effect as a change in the temperature of the bulb I place the control within a sealed chamber and vary the pressure within the chamber so that it acts upon the bellows or diaphragm of the control in order to operate the apparatus by varying the expansion of the bellows or diaphragm.

Referring now to the drawing, the refrigerator switch, generally designated by the reference character 20, is held within a sealed casing 22. The refrigerator switch, serving as a typical example of a thermostatic type control, includes a bellows 24 connected by capillary tubing 26 to a bulb 28. At present, it has become the practice to make the bulb the same size as the tube. The bulb is normally charged with a volatile liquid so that the pressure within the bellows, tube and bulb system varies according to the temperature at the point where the volatile liquid is present. This point is ordinarily the coldest point. However, instead of a volatile liquid system an adsorbent or absorbent may be provided in the bulb and a gas capable of being adsorbed by the absorbent may be used for control purposes.

The bellows is supported on a frame 30 of insulating material. This frame 30 supports the entire switch mechanism which includes a primary lever 32, operated by the bellows, and a secondary lever 34 connected to the end of the primary lever. A toggle spring 36 connects the free end of the secondary lever 34 with a contact lever 38 pivoted upon the pin 40 on the frame 30. The contact lever 38 is provided with a contact arm 42 carrying electrical contacts adapted to make contact with the contact post 44 within the frame 30. This contact arm 42 has its contacts connected electrically by the pig-tail connection 46 to a post 48 having a connecting screw 50 upon the outside of the frame 30 while the contact post 44 has a contact screw 52 upon the outside of the frame 30.

The expansion of the bellows 24 is opposed by the range spring 54 fastened to an adjustable anchorage 56 which is moved by the range screw 58 in order to vary the range setting of the switch. The switch is also provided with a differential adjusting screw 62 which is adapted to adjust the differential of the switch by acting as a stop to limit the opening movement of the contact lever 38 which is provided with a pin 60 for engaging the lower end of the differential adjusting screw 62.

The sealed casing 22 is provided with some suitable form of rapid opening and closing closure member 155 which makes it possible to insert and remove the refrigerator switch with a minimum of difficulty. The switch 20 is yieldingly held against the left side wall of the sealed casing by a spring member 64 and is located vertically by a pin or rib 66 provided upon this wall. Thus this locates the switch within the sealed casing. A pair of spring members 68 and 70 hold the switch against the pin or locating rib 66 as well as hold the contacts 50 and 52 in engagement with the spring contacts 72 and 74. These spring contacts are connected by the conductors 76 and 78 which extend through the walls of the sealed casing 22 to a signal light or indicating device 80 and a power source 82 such as a battery in order to provide a complete indicating circuit to indicate when the contact arm 42 is in closed position. If desired, suitable windows 151 and 153 may be provided in the sealed casing in order to view the actual operation of the switch.

The sealed casing 22 is preferably made deep enough to provide a well 84 containing a liquid bath 86 of water or some other suitable liquid for receiving the bulb 28. If desired, this well or bath may be insulated from the walls of the casing. This bath 86 is kept at a substantially constant temperature with great accuracy by a temperature regulating coil 88 which is controlled by a temperature regulating mechanism 90 provided adjacent the well 84. This temperature regulating mechanism may be of any suitable type capable of maintaining the bath 86 at a substantially constant temperature with great accuracy.

In order to vary the pressure within the sealed casing I provide a source of vacuum or evacuating means 92 and a source of pressure 94 both indicated diagrammatically. These are connected by a two-way valve 96 through the pipe at 98 with the interior of the sealed casing 22. It is obvious that by varying the connection of the interior of the sealed casing with the source of pressure or vacuum in varying proportions, that any desired absolute pressure may be attained within the sealed casing 22. This pressure or vacuum is preferably measured by some suitable gauge or recording instrument such as the one designated by the reference character 102. This gauge should be one which is either compensated or calibrated for the changes in barometric pressure.

In addition, the casing is provided with an external adjusting means 104 comprising a slidable and rotatable operating pin extending through the packing gland 106 to the interior of the sealed casing and provided with a connecting means 108 for connecting with the splined upper end of the range adjusting screw 58. Adjacent this adjustment is a slidable and rotatable operating pin 110 extending through a packing gland 112 to the interior of the sealed casing where it is provided with an end 114 shaped like a screwdriver end for entering into the screw-driver slot provided in the head of the differential adjusting screw 62.

This apparatus is used in the following manner: The sealed casing 22 is opened and the refrigerator switch or other type of control is inserted to the position shown in Fig. 1. The bath 86 is maintained at a substantially constant temperature with great accuracy by the temperature control mechanism 90. By properly manipulating two-way valve 96, the pressure within the sealed casing is brought to such a point as to provide the equivalent of changing the temperature of the bulb to the cut-out point. The range screw 58 is then adjusted by moving the operating pin 104 downwardly to engage the end of the range screw 58 and rotating the pin 104 to turn the range screw so that the switch will just open at this pressure. The pressure within the casing may be run up and down over this point in order to check and set accurately the cut-out point. The cutting in and cut-out of the switch may be observed visually through windows 151 and 153 in the sealed casing and also may be observed by the lighting and extinguishing of the indicating light or signal 80.

The cut-in point of the switch is set in substantially the same way. The differential screw 62 which adjusts the cut-in point of the switch is adjusted by moving the operating pin 110 downwardly to engage the slot in the differential screw 62. By properly manipulating the two-way valve 96, the pressure within the sealed casing is brought to such a point as to provide the equivalent of changing the temperature of the bulb to the cut-in point. The differential screw 62 is then adjusted so that the switch will just close at this point. The pressure within the casing may be run up and down over this point in order to check and set accurately the cut-in point.

The pressures for the cut-in and cut-out points may be determined in the following manner: From a pressure temperature chart of the volatile liquid used in the switch or control bulb 28, the pressure generated at the well temperature such as 40° is determined. For example, sulphur dioxide at 40° F. has a pressure of about 12.4 pounds per square inch gauge. Then, from the same chart, the pressure of sulphur dioxide at the cut-out temperature is determined. If the cut-out temperature is 10° F. sulphur dioxide reaches this temperature at 2.6 inches of vacuum or about 1.3 pounds vacuum. In order to secure the equivalent of this pressure when the bulb is in the well at 40° F. it is necessary to apply a pressure within the casing to compensate for the difference between the pressure at the well temperature of 40° and the pressure at the desired cut-in temperature of 10° F. This difference therefore, since the cut-out point is a vacuum, would be 12.4 plus 1.3 or 13.7 pounds approximately. These pressures are for a barometer of 29.92 inches. Where the barometer is less, the pressure must be increased in the proportion of about one-half pound for each inch to compensate for the lower barometric pressures so that the absolute pressures will be the same. The following is a table showing the various gauge pressures required to obtain the same effect as actual bulb temperatures when sulphur dioxide, methyl chloride or difluorodichloromethane (F-12) are used in the bulb of a control at a barometric pressure of 29.4 inches and a well temperature of 40° F.

| Switch set | Pr. $SO_2$ | Pr. $CH_3Cl$ | Pr. F-12 |
|---|---|---|---|
| −10 F | 19.3 lb. gauge | 28 lbs | 32.9 lbs. |
| 0 | 17.0 | 23.9 | 27.7. |
| +10 F | 13.9 | 19.3 | 22.2. |
| 20 | 10.1 | 13.9 | 16.0. |
| 30 | 5.5 | 7.5 | 9.0. |
| 40 | 0 | 0 | 0. |
| 50 | 13″ vac | 18″ vac | 20″ vac. |

While the form of embodiment of the invention as herein disclosed, constitutes a preferred form, it is to be understood that other forms might be adopted, all coming within the scope of the claims which follow.

What is claimed is as follows:

1. An apparatus for thermostatic control devices having thermo-sensitive and pressure elements and circuit closing means comprising a sealed casing having an access opening and a sealing cover for the access opening, means for supporting a control device in the sealed casing, means for maintaining the thermo-sensitive element of the device at a substantially constant temperature, means for changing the pressure within the sealed casing to deflect the pressure element of the device, an electrically energized indicating means outside said sealed casing, an electric circuit portion provided with connections to and completed by the circuit closing means of the particular thermostatic control device in position in said casing when the circuit closing means is in the closed position, and a source of energy for said circuit portion, said circuit portion extending to and connecting to said indicating means for controlling said indicating means to indicate a closed circuit position of the circuit closing means.

2. An apparatus for thermostatic control devices having thermo-sensitive and pressure elements and movable means operated by the deflection of the pressure element into and out of a certain position comprising a sealed casing having an access opening and a sealing cover for the access opening, means for supporting a control device in the sealed casing, means for maintaining the thermo-sensitive element of the device at a substantially constant temperature, means for changing the pressure within the sealed casing to deflect the pressure element of the device, and means controlled by said movable means for indicating outside the sealed casing when said movable means is in said certain position.

3. An apparatus for adjustable thermostatic devices having thermo-sensitive and pressure elements and adjustment means comprising a sealed casing having an access opening and a sealing cover for the access opening, means for supporting a thermostatic device in the sealed casing, means for maintaining the thermo-sensitive element of the device at a substantially constant temperature, means for changing the pressure within the sealed casing to deflect the pressure element of the device, and adjusting means operable from the outside of the casing for operating the adjustment means of the device within the casing.

4. The method of calibrating a thermostatic device having a pressure element normally exposed to atmospheric pressure variations only and a thermo-sensitive element which comprises immersing the thermo-sensitive element in a fluid maintained at a substantially constant temperature, and varying in selected increments outside the normal range of atmospheric pressure the external pressure on the pressure element to deflect the pressure element.

5. The method of calibrating an adjustable thermostatic device having a pressure element normally exposed to atmospheric pressure variations only and provided with a thermo-sensitive portion, and means operable from one position to another by the deflection of the thermo-sensitive element which comprises maintaining the thermosensitive portion of the device at a substantially constant temperature, varying in selected increments outside the normal range of atmospheric pressure the external pressure on the pressure element to deflect the pressure element to operate the device, measuring the external pressure on the pressure element, and adjusting the device while the pressure element is subject to the measured external pressure.

6. The method of testing adjustable thermostatic control devices having thermo-sensitive and pressure elements for actuating the control element to determine whether the control elements operate at certain temperatures to which the thermo-sensitive elements are responsive and in adjusting the setting of the control device to obtain such a result which comprises maintaining the thermo-sensitive element at a substantially constant temperature, applying to the pressure element an external pressure corresponding to the difference between the pressure generated by the thermo-sensitive element at the substantially constant temperature at which it is held and the pressure generated by the thermo-sensitive element at the temperature at which the control element is desired to be operated, and adjusting the control device so that the control element will operate at such a temperature.

7. The method of calibrating a thermostatic device having a pressure element normally exposed to atmospheric pressure variations only and a thermo-sensitive element which comprises immersing the thermo-sensitive element in a fluid maintained at a substantially constant temperature, varying in selected increments outside the normal range of atmospheric pressure the external pressure on the pressure element to deflect the pressure element, and simultaneously indicating the external pressure upon the pressure element.

8. An apparatus for adjustable thermostatic devices having thermo-sensitive and pressure elements and adjustment means comprising a sealed casing having an access opening and a sealing cover for the access opening, means for supporting a thermostatic device in the sealed casing, means for maintaining the thermo-sensitive element of the device at a substantially constant temperature, means for changing the pressure within the sealed casing to deflect the pressure element of the device, means for indicating the pressure within the sealed casing, and adjusting means operable from the outside of the casing for operating the adjustment means of the device within the casing.

9. A testing apparatus for adjustable thermostatic devices having thermo-sensitive and pressure elements for actuating the control element comprising a sealed casing having an access opening and a sealed cover for the opening, a support within the casing for said thermostatic devices, a constant temperature means for the thermo-sensitive element, means for varying the pressure within the casing for varying the external pressure upon the pressure element, means for indicating the pressure within the casing, said casing being provided with means extending from the interior to the exterior of the casing in a fluid sealed manner for setting the adjustable feature of the device.

10. A testing apparatus for adjustable thermostatic control devices having thermo-sensitive and pressure elements for actuating the control element comprising a sealed casing having an access opening and a sealed cover for the opening, a support within the casing for said control devices, a constant temperature means for the thermo-sensitive element, means for varying the pressure within the casing for varying the external pressure upon the pressure element, means for indicating the pressure within the casing, said casing being provided with means extending from the interior to the exterior of the casing in a fluid sealed manner for setting the adjustable feature of the control device, said casing being provided with a window for observing the operation of the control element.

11. A testing apparatus for adjustable thermostatic control devices having thermo-sensitive and pressure elements for actuating the control element to and from a certain position comprising a sealed casing having an access opening and a sealed cover for the opening, a support within the casing for said control devices, a constant temperature means for the thermo-sensitive element, means for varying the pressure within the casing for varying the external pressure upon the pressure element, means for indicating the pressure within the casing, said casing being provided with means extending from the interior to the exterior of the casing in a fluid sealed manner for setting the adjustable feature of the control device, and means controlled by said control element for indicating outside said sealed casing when the control element is in said certain position.

12. An apparatus for testing adjustable thermostatic devices having thermo-sensitive and pressure elements and means operated by the deflection of the pressure element comprising means including a liquid bath for receiving the thermo-sensitive element and for maintaining the thermo-sensitive element at a substantially constant temperature, means for supporting the pressure element with the thermo-sensitive element disposed in the bath, means for varying the external pressure on the pressure element to deflect the pressure element to operate the device being tested, and means for indicating the external pressure on the pressure element.

13. An apparatus for testing adjustable thermostatic devices having thermo-sensitive and pressure elements and means operated by the deflection of the pressure element comprising an enclosure for receiving an adjustable thermostat device, means within said enclosure for maintaining the thermo-sensitive element at a substantially constant temperature, means for varying the pressure within the enclosure to deflect the pressure element to operate the device being tested, and means for indicating the pressure within the enclosure.

GEORGE C. PEARCE.